US009298840B2

(12) United States Patent
Chand

(10) Patent No.: US 9,298,840 B2
(45) Date of Patent: Mar. 29, 2016

(54) VIDEO USER INTERFACE ELEMENTS ON SEARCH ENGINE HOMEPAGES

(75) Inventor: Rajeev Chand, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 520 days.

(21) Appl. No.: 13/531,216

(22) Filed: Jun. 22, 2012

(65) Prior Publication Data

US 2013/0019147 A1    Jan. 17, 2013

Related U.S. Application Data

(63) Continuation-in-part of application No. 13/183,135, filed on Jul. 14, 2011, now Pat. No. 8,381,105.

(51) Int. Cl.
*G06F 17/30* (2006.01)

(52) U.S. Cl.
CPC ................. *G06F 17/3089* (2013.01)

(58) Field of Classification Search
USPC ................. 715/201, 203, 716, 719
See application file for complete search history.

(56) References Cited

U.S. PATENT DOCUMENTS

| 5,467,413 | A | * | 11/1995 | Barrett ........................ 382/236 |
| 6,006,265 | A | | 12/1999 | Rangan et al. |
| 6,089,975 | A | | 7/2000 | Dunn |
| 6,119,123 | A | * | 9/2000 | Elenbaas et al. |
| 7,035,803 | B1 | | 4/2006 | Ostermann et al. |
| 7,043,521 | B2 | | 5/2006 | Eitel |
| 7,460,130 | B2 | | 12/2008 | Salganicoff |
| 7,594,177 | B2 | | 9/2009 | Jojic et al. |
| 2002/0097983 | A1 | * | 7/2002 | Wallace et al. ................. 386/55 |
| 2002/0133828 | A1 | | 9/2002 | Foster |
| 2002/0161909 | A1 | | 10/2002 | White |
| 2003/0030659 | A1 | * | 2/2003 | Wu ............................... 345/716 |
| 2004/0221322 | A1 | * | 11/2004 | Shen et al. .................... 725/135 |
| 2006/0048191 | A1 | * | 3/2006 | Xiong ............................ 725/52 |
| 2006/0285821 | A1 | * | 12/2006 | Kim et al. ....................... 386/83 |
| 2007/0130015 | A1 | | 6/2007 | Starr et al. |
| 2008/0168040 | A1 | * | 7/2008 | Jones et al. ...................... 707/3 |
| 2009/0013288 | A1 | * | 1/2009 | Scheflan ...................... 715/859 |

(Continued)

OTHER PUBLICATIONS

"Animation Features", Retrieved on: Mar. 7, 2012, Available at: http://web.biosci.utexas.edu/psaxena/MicrobiologyAnimations/stage/features.html.

(Continued)

*Primary Examiner* — Andrew Dyer
(74) *Attorney, Agent, or Firm* — Dave Ream; Jim Ross; Micky Minhas

(57) ABSTRACT

Systems, methods, and computer-readable storage media exposing video user interface elements associated with search engine homepages are provided. Upon receiving a request for presentation of a search engine homepage, a video file is transmitted for presentation as the background for the search engine homepage. The video file includes a plurality of sequentially-arranged frames, a portion of which contain the same content, making such portion appear as a static image upon play of the video file, and a portion of which contain content which differs, such that such portion has visually discernable movement upon play of the video file. After a predetermined amount of time, play of the video file is initiated. As only portions of the background content include visually discernable movement, a user's attention is attracted to such portions of the background. Upon user interaction with such portions, additional information about the background content may be presented.

19 Claims, 4 Drawing Sheets

(56) References Cited

U.S. PATENT DOCUMENTS

| | | | | |
|---|---|---|---|---|
| 2009/0327913 | A1* | 12/2009 | Adar et al. | 715/745 |
| 2010/0037138 | A1* | 2/2010 | Shcherbakov et al. | 715/716 |
| 2010/0095345 | A1* | 4/2010 | Tran et al. | 725/131 |
| 2010/0241962 | A1* | 9/2010 | Peterson et al. | 715/720 |
| 2013/0006952 | A1* | 1/2013 | Wong et al. | 707/706 |

OTHER PUBLICATIONS

"Hot FlashVideo", Published on: Feb. 3, 2006, Available at: http://www.flashloaded.com/flashcomponents/hotflashvideo/.

Hendrickson, Mark, "Asterpix Video Hotspots Now Generated Automatically", Published on: Mar. 5, 2008, Available at: http://techcrunch.com/2008/03/05/asterpix-video-hotspots-now-generated-automatically/.

Liu, et at., "A Fast Image Segmentation Algorithm for Interactive Video Hotspot Retrieval", In IEEE Workshop on Content-Based Access of Image and Video Libraries, 2001, pp. 3-8.

Zeman, Casey, "YouTube Insight HotSpots: Reviewing Viewer Attention for Entertainment & Informative Video", Retrieved on: Mar. 7, 2012, Available at: http://www.reelseo.com/youtube-insight-hotspots/.

Mel, "How to Make Web Video with an Embedded Hotspot Button", Retrieved on: Mar. 7, 2012, Available at: http://www.melaclaro.com/2012/01/21/how-to-make-web-video-with-an-embedded-hotspot-button/.

"Flash Animations over Quicktime Hotspots", Published on: Feb. 3, 2006, Available at: http://www.harlands.com/article.php?id=00033.

Syd Lawrence; jquery.videoBG; Mar. 13, 2011; GitHub; pp. 1-9.

dSKY; Full Screen Video Background Template v2; Sep. 23, 2009; Active Den; pp. 1-7.

Non-Final Office Action mailed Aug. 21, 2012 in U.S. Appl. No. 13/183,135, 26 pages.

Notice of Allowance mailed Dec. 31, 2012 in U.S. Appl. No. 13/183,135, 8 pages.

* cited by examiner

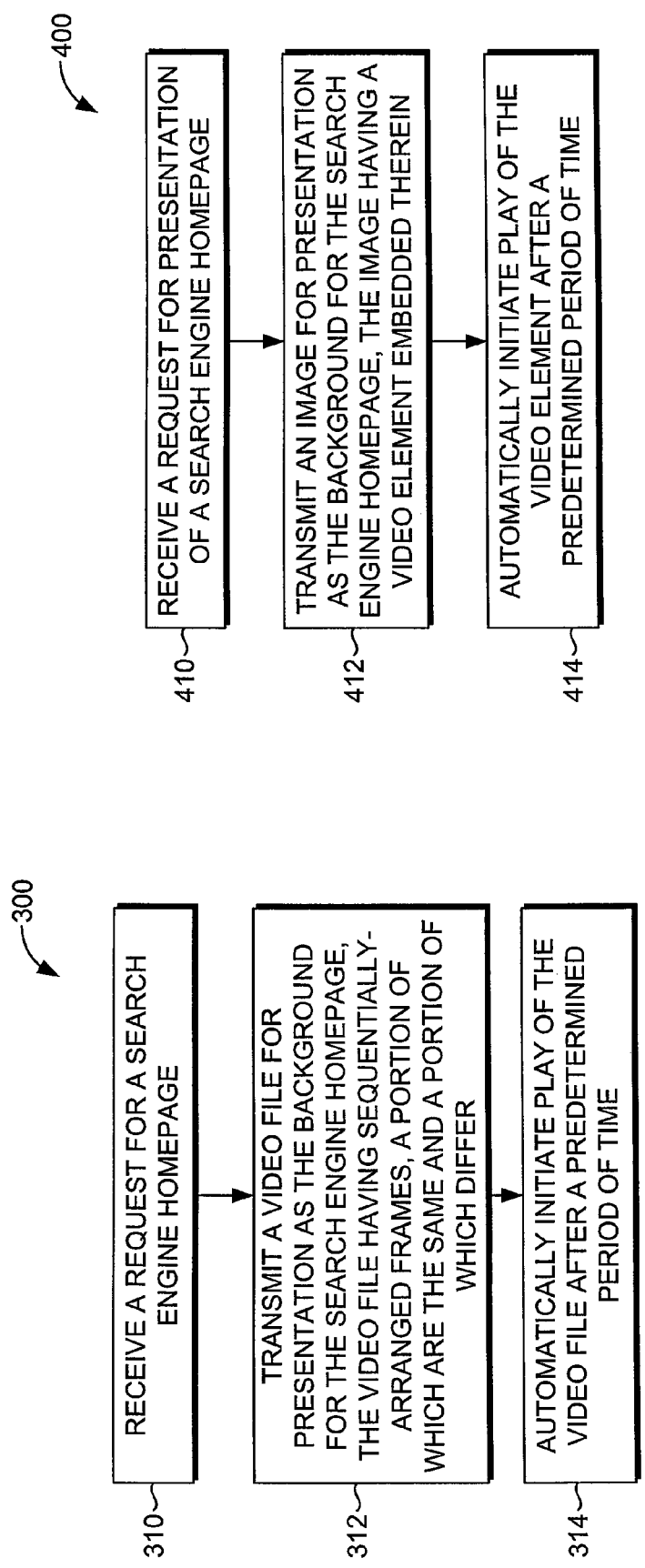

VIDEO USER INTERFACE ELEMENTS ON SEARCH ENGINE HOMEPAGES

CROSS-REFERENCE TO RELATED APPLICATIONS

This application is a continuation-in-part and claims priority to U.S. application Ser. No. 13/183,135, filed Jul. 14, 2011 and entitled "Video on a Search Engine Homepage," which application is hereby incorporated by reference as if set forth in its entirety herein.

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. Initially upon a user expressing a desire to utilize a search utility, a homepage associated with the particular search utility is presented that includes a search query input area into which the user may input keywords or phrases for which relevant search results are desired.

With the increased usage of search utilities, search engines have begun to add features and functionality to their search engine homepages to provide users navigating to these utilities with a richer, more satisfying experience. One such feature is background content that incorporates interactive functionality to permit users navigating to the search engine homepage to discover interesting information about the content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, exposing video user interface elements associated with search engine homepages. Upon receiving a request for presentation of a search engine homepage, a video file is transmitted for presentation as the background for the search engine homepage. The video file includes a plurality of sequentially-arranged frames, a portion of which contain the same content, making such portion appear as a static image upon play of the video file, and a portion of which contain content which differs, such that such portion has visually discernable movement upon play of the video file. After a predetermined amount of time, play of the video file is initiated without user interaction. As only portions of the background content include visually discernable movement, a user's attention is attracted to such portions of the background. In embodiments, upon user interaction with such background portions, additional information about the background content may be presented.

BRIEF DESCRIPTION OF THE DRAWINGS

The present invention is illustrated by way of example and not limitation in the accompanying figures in which like reference numerals indicate similar elements and in which:

FIG. 3 is a flow diagram showing an exemplary method for exposing video user interface elements associated with a search engine homepage, in accordance with an embodiment of the present invention;

FIG. 4 is a flow diagram showing an exemplary method for exposing video user interface elements associated with a search engine homepage, in accordance with an embodiment of the present invention.

DETAILED DESCRIPTION

Figure 1:
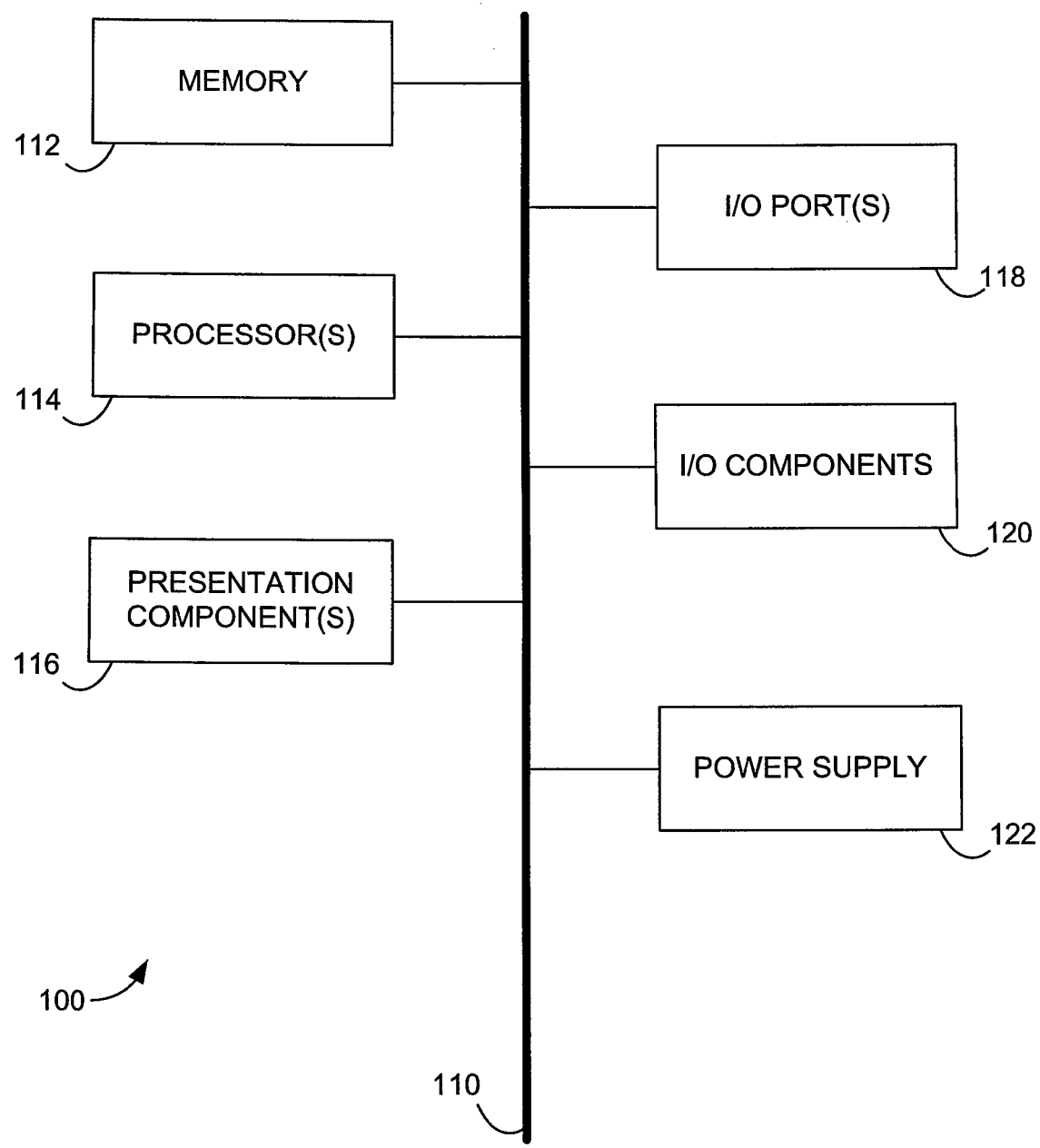
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, exposing video user interface elements associated with search engine homepages. Upon receiving a request for presentation of a search engine homepage, a video file is transmitted for presentation as the background for the search engine homepage. The video file includes a plurality of sequentially-arranged frames, a portion of which contain the same content, making such portion appear as a static image upon play of the video file, and a portion of which contain content which differs, such that such portions has visually discernable movement upon play of the video file. After a predetermined amount of time (e.g., after a predetermined period of user inactivity with respect to the search engine homepage), play of the video file is initiated without user interaction. As only portions of the background content include visually discernable movement, a user's attention is attracted to such portions of the background. In this way, the user is provided a rich, interactive experience at the search engine homepage that feels more engaging than a static image background. (It should be noted that while the phrase "search engine homepage" is used herein, the functionality described is equally applicable to any online landing page. Any and all such variations, and any combination thereof, are contemplated to be within the scope of embodiments of the present invention.)

Accordingly, one embodiment of the present invention is directed to one or more computer-readable storage media storing computer-useable instructions that, when used by one or more computing devices, cause the one or more computing devices to perform a method for exposing video user interface elements associated with search engine homepages. The method includes receiving a request for presentation of a search engine homepage and transmitting a video file for presentation as the background for the search engine homepage. The video file includes a plurality of sequentially-arranged frames, wherein a first portion of the plurality of sequentially-arranged frames contains the same content and a second portion of the plurality of sequentially-arranged frames contains content which differs. After a predetermined period of time (e.g., after a predetermined period of user inactivity with respect to the search engine homepage), the method further includes automatically initiating play of the video file without user action.

In another embodiment, the present invention is directed to a system for exposing video user interface elements associated with search engine homepages. The system comprises a computing device associated with one or more processors and one or more computer-readable storage media, a search server, and a data store coupled with the server. The search server is configured to receive a request for presentation of a search engine homepage; transmit an image for presentation as the background for the search engine homepage, the image having at least one video element embedded therein; and after a predetermined amount of time (e.g., after a predetermined period of user inactivity with respect to the search engine homepage), automatically initiate play of the at least one video element without user interaction.

In yet another embodiment, the present invention is directed to a method being performed by one or more computing devices including at least one processor, for exposing video user interface elements associated with search engine homepages. The method includes receiving a request for presentation of a search engine homepage from a client device, determining that the requesting client device is capable of presenting video content as the background of the search engine homepage, and transmitting a video file for presentation as the background for the search engine homepage. The video file includes a plurality of sequentially-arranged frames, wherein a first portion of the plurality of sequentially-arranged frames contains the same content and a second portion of the plurality of sequentially-arranged frames contains content which differs. One of the sequentially-arranged frames is an optimized frame of the video file. The method further includes, after a predetermined amount of time (e.g., after a predetermined period of user inactivity with respect to the search engine homepage), automatically initiating play of the video file without user interaction. Once play of the video file is completed, the optimized frame of the video file is presented as the background of the search engine homepage.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network.

In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

With continued reference to FIG. 1, computing device 100 includes a bus 110 that directly or indirectly couples the following elements: memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer storage media in the form of volatile and/or nonvolatile memory. The memory may be removable, non-removable, or a combination thereof. Exemplary hardware devices include solid state memory, hard drives, optical disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, etc.

As previously mentioned, embodiments of the present invention relate to systems, methods, and computer-readable storage media for, among other things, exposing video user interface elements associated with search engine homepages. Upon receiving a request for presentation of a search engine homepage, a video file is transmitted for presentation as the background for the search engine homepage. The video file includes a plurality of sequentially-arranged frames, a portion of which contain the same content, making such portion appear as a static image upon play of the video file, and a portion of which contain content which differs, such that such portion has visually discernable movement upon play of the video file. After a predetermined amount of time (e.g., after a predetermined period of user inactivity with respect to the search engine homepage), play of the video file is initiated without user interaction. As only portions of the background content include visually discernable movement, a user's attention is attracted to such portions of the background. In this way, the user is provided a rich, interactive experience at the search engine homepage that feels more engaging than a static image background.

Figure 2:
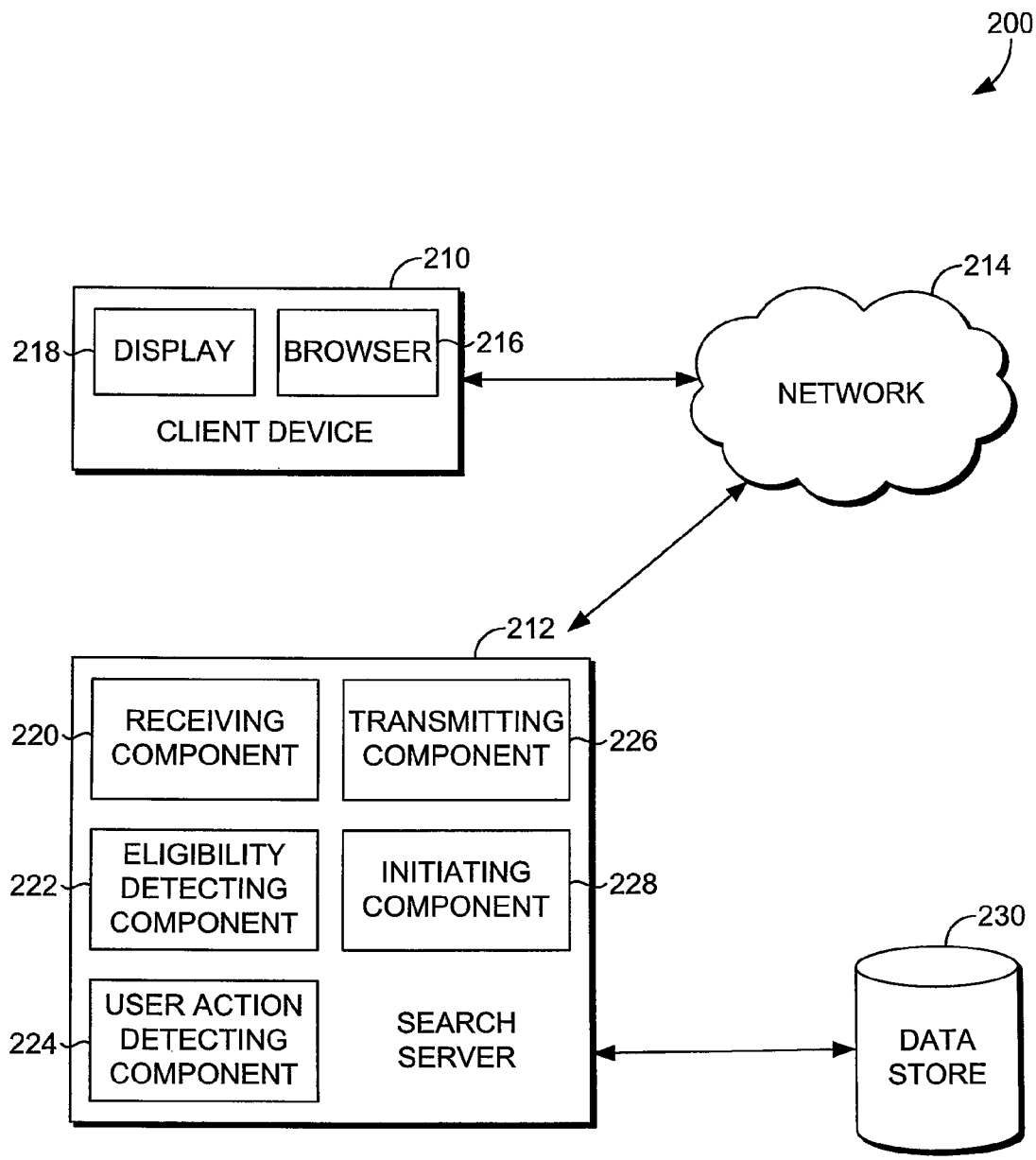
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which a video file may be transmitted and displayed as the background for a search engine homepage at a client computing device and/or an image having one or more video elements embedded therein may be transmitted and displayed as the background for a search engine homepage. As will be described in further detail below, embodiments of the present invention provide a rich, interactive experience that attracts a user's attention, feels engaging, and promotes the user's desire to interact with the search engine homepage.

Among other components not shown, the computing system 200 generally includes a client computing device 210 and a search server 212 in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of client computing devices and search servers may be employed in the computing system 200 within the scope of embodiments of the present invention. Each may comprise a single device/interface or multiple devices/interfaces cooperating in a distributed environment. For instance, the search server 212 may comprise multiple devices and/or modules arranged in a distributed environment that collectively provide the functionality of the search server 212 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the client computing device 210, as an Internet-based service, or as a module inside the search server 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the search server 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. As illustrated, the client computing device 210 includes a browser 216 and a display 218. The browser 216 is configured to render a search engine homepage having a static image and/or video as at least a portion of the background in association with the display 218 of the user computing device 210. The browser 216 is further configured to receive user input of requests for various web pages (including search engine homepages) and to receive content for display, for instance, from the search server 212. It should be noted that the functionality described herein as being performed by the browser 216 may be performed by any other application capable of rendering Web content. Any and all such variations, and any combination thereof, are contemplated to be within the scope of embodiments of the present invention.

The search server 212 is configured to receive and respond to requests that it receives from components associated with client computing devices, for instance, the browser 216 associated with the client computing device 210. The search server 212 may be associated with any search engine capable of searching text and/or content. Those skilled in the art will recognize that the present invention may be implemented with any number of searching utilities. For example, an Internet search engine or a database search engine may utilize the present invention. These search engines are well known in the art, and commercially available engines share many similar processes not further described herein.

As illustrated, the search server 212 includes a receiving component 220, an eligibility detecting component 222, a user action detecting component 224, a transmitting component 226, and an initiating component 228. The illustrated search server 212 also includes or has access to a data repository 230. The data repository 230 is configured to store information associated with static images, video files, and the like. In various embodiments, such information may include, without limitation, raw image and/or video files, optimized image and/or video files, and the like. In embodiments, the data repository 230 is configured to be searchable for one or more of the items stored in association therewith. It will be understood and appreciated by those of ordinary skill in the art that the information stored in association with the data repository 230 may be configurable and may include any information relevant to images and/or video files to be associated with presentation as at least a portion of the background for a search engine homepage. The content and volume of such information are not intended to limit the scope of embodiments of the present invention in any way. Further, though illustrated as a single, independent component, the data repository 230 may, in fact, be a plurality of storage devices, for instance a database cluster, portions of which may reside in association with the search server 212, the client computing device 210, another external computing device (not shown), and/or any combination thereof.

The receiving component 220 of the search server 212 is configured to receive requests for presentation of search engine homepages. Typically, such a request is received via a browser associated with the client computing device, for instance, the browser 216 associated with the client computing device 210.

The eligibility detecting component 222 is configured to detect or determine whether a requesting client computing device is capable of receiving video content as at least a portion of the background of a search engine homepage and of presenting the same. In embodiments, the eligibility detecting component 222 may also be configured to detect or determine which video format(s) are supported by a requesting client device that it determines to be capable of presenting video content as at least a portion of the background of a search engine homepage. In embodiments, the eligibility detecting component 222 may be further configured to determine whether any applicable user-preference settings permit or hinder such presentation of video content as at least a portion of the background of a search engine homepage.

The user action detecting component 224 is configured to detect user actions taken with respect to a presented search engine homepage. Such actions may include, by way of example only, mouse movements, clicking, tapping and the like with respect to the background of the search engine homepage, predefined portions of the background, and/or within a predefined proximity of various portions of the background. Actions resulting from detected user actions are more fully described below.

The transmitting component 226 is configured to transmit video files for presentation as at least a portion of the background of a search engine homepage, for instance, to a browser associated with a client computing device. In embodiments, such transmission takes place in a video format determined to be acceptable by the requesting client computing device. In embodiments, such video files may be optimized (e.g., utilizing compression and/or resolution-altering techniques) prior to transmission.

In accordance with embodiments hereof, transmitted video files include a plurality of sequentially-arranged frames, a first portion of which contain the same content, making such portion appear as a static image upon play of the video file, and a second portion of which contain content which differs, such that such portions has visually discernable movement upon play of the video file. As only portions of the background content include visually discernable movement, a user's attention is attracted to such portions of the background upon play of the video file.

In embodiments, the portions of the sequentially-arranged frames that contain content which differs comprise one or more user interface elements or interactive regions of the search engine homepage. Upon user interaction with a particular user interface element (for instance, upon a user hovering over, selecting, and/or tapping on a region of the background of the search engine homepage that is within a predefined proximity to the particular user interface element), additional information segments are presented. The additional information segments generally relate in some way to the underlying content associated with the particular interactive region. In embodiments, one or more of the user interface elements includes a visible boundary when the video file is not playing, alerting users to the existence of an enhanced experience even when the video file is not playing.

The transmitting component 226 is further configured to transmit images for presentation as the background of a search engine homepage, the image having one or more video elements embedded therein. In such embodiments, upon initiation of play of the video elements, only those portions of the background image having an embedded video element will have visually discernable movement. As such, a user's attention will be similarly attracted to such portions of the background upon play of the video file. In embodiments, the portions of the background image having video elements embedded therein comprise one or more user interface elements or interactive regions of the search engine homepage. As described above, upon user interaction with a particular user interface element (for instance, upon a user hovering over or selecting a region of the background of the search engine homepage that is within a predefined proximity to the particular user interface element), additional information segments are presented. The additional information segments generally relate in some way to the underlying content associated with the particular interactive region. In embodiments, one or more of the user interface elements includes a visible boundary when the video file is not playing, alerting users to the existence of an enhanced experience even when the video file is not playing.

The initiating component 228 is configured to initiate play of a video file and/or embedded video elements that are transmitted by the transmitting component 226. In embodiments, such initiation takes place automatically without user action. It will be understood and appreciated by those of ordinary skill in the art that user-initiation of play of video file content is also contemplated to be within the scope of embodiments of the present invention. In embodiments, after a predetermined amount of time (for instance, after a predetermined period of user inactivity with respect to the search engine homepage), play of the video file and/or video elements is initiated. In embodiments, upon detection of a user action, play of the video file and/or video elements is initiated. Any and all such variations, and any combination thereof, are contemplated to be within the scope of embodiments of the present invention.

Turning now to FIG. 3, a flow diagram is illustrated showing an exemplary method 300 for exposing video user interface elements associated with search engine homepages, in accordance with an embodiment of the present invention. As indicated at block 310, a request for presentation of a search engine homepage is received, for instance, by the receiving component 220 of the search server 212 of FIG. 2. A video file is then transmitted for presentation as the background for the search engine homepage (for instance, by the transmitting component 226 of the search server 212 of FIG. 2), as indicated at block 312. The video file includes a plurality of sequentially-arranged frames, a first portion of which contain the same content and a second portion of which contain content which differs. In embodiments, one of the plurality of sequentially-arranged frames is an optimized frame of the video file that is presented as the background for the search engine homepage when the video file is not playing. As indicated at block 314, after a predetermined amount of time, play of the video file is automatically initiated without user action. In embodiments, play of the video file may be initiated upon detection of a user action (for instance, a mouse movement, a click, a tap, or the like), instead of or in addition to expiration of a predetermined period of time. Any and all such variations, and any combination thereof, are contemplated to be within the scope of embodiments of the present invention.

Though not illustrated in FIG. 3, in embodiments, prior to transmitting the video file for presentation as the background for the search engine homepage, it may be determined whether the requesting client device is capable of presenting video content as the background for the search engine homepage, for instance, by the eligibility detecting component 222 of the search server 212 of FIG. 2.

Additionally, though not illustrated in FIG. 3, a second user action with respect to a particular portion of the background of the search engine homepage may be detected (for instance, utilizing the user action detecting component 224 of FIG. 2). The second user action may include, by way of example only, a hover action over a region of the background image, a click over a region of the background image, or a tap over a region of the background image. In embodiments, upon detecting the second user action, an additional information segment associated with the particular region of the background of the search engine homepage may be presented. In another embodiment, upon detecting the second user action, the additional information segments associated with each of a plurality of interactive regions of the background of the search engine homepage are simultaneously presented. In this way, users are able to easily determine which additional information segments s/he finds most interesting.

With reference now to FIG. 4, a flow diagram is illustrated showing an exemplary method 400 for exposing video user interface elements associated with search engine homepages, in accordance with an embodiment of the present invention. As indicated at block 410, a request for presentation of a search engine homepage is received, for instance, by the receiving component 220 of the search server 212 of FIG. 2. An image is then transmitted for presentation as the background for the search engine homepage, the image having at least one video element embedded therein, as indicated at block 412. In embodiments, each video element is an interactive user interface element associated with an additional information segment relevant to the background of the search engine homepage that may be presented upon the user taking a predefined action with respect thereto. As indicated at block 414, after a predetermined amount of time (e.g., after a predetermined period of user inactivity with respect to the search engine homepage), play of the at least one video element is initiated without user interaction. In embodiments, play of the video elements may be initiated upon detection of a user action (for instance, a mouse movement, a click, a tap, or the like), instead of or in addition to expiration of a predetermined period of time. Any and all such variations, and any combination thereof, are contemplated to be within the scope of embodiments of the present invention.

Though not illustrated in FIG. 4, in embodiments, prior to transmitting an image having embedded video elements for presentation as the background for the search engine homepage, it may be determined whether the requesting client device is capable of presenting video content as the background for the search engine homepage, for instance, by the eligibility detecting component 222 of the search server 212 of FIG. 2.

Figure 5:
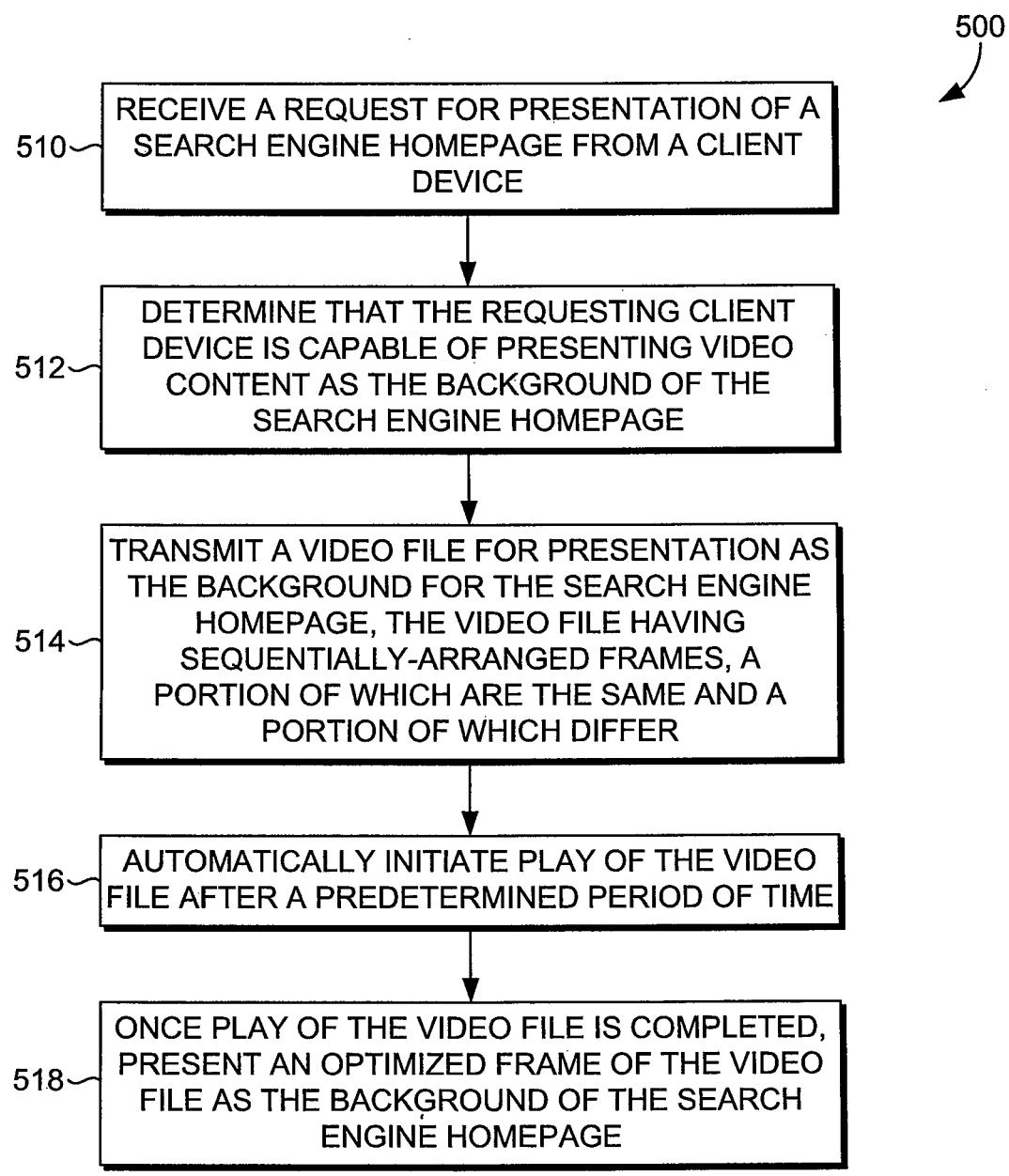
FIG. 5 is a flow diagram showing another exemplary method for exposing video user interface elements associated with a search engine homepage, in accordance with an embodiment of the present invention.

With reference now to FIG. 5, a flow diagram is illustrated showing another exemplary method 500 for exposing video user interface elements associated with search engine homepages, in accordance with an embodiment of the present invention. As indicated at block 510, a request for presentation of a search engine homepage is received, for instance, by the receiving component 220 of the search server 212 of FIG. 2. It is then determined, as indicated at block 512, that the requesting client device is capable of presenting video content as the background of the search engine homepage, for instance, by the eligibility detecting component 222 of the search server 212 of FIG. 2. A video file is then transmitted for presentation as the background for the search engine homepage, as indicated at block 514. The video file includes a plurality of sequentially-arranged frames, a first portion of which contain the same content and a second portion of which contain content which differs. One of the sequentially-arranged frames is an optimized frame of the video file. In embodiments, each second portion of the video file is an interactive user interface element associated with an additional information segment relevant to the background of the search engine homepage that may be presented upon the user taking a predefined action with respect thereto.

As indicated at block 516, after a predetermined amount of time (for instance, after a predetermined period of user inactivity with respect to the search engine homepage), play of the video file is automatically initiated without user interaction. In embodiments, play of the video file may be initiated upon detection of a user action (for instance, a mouse movement, a click, a tap, or the like), instead of or in addition to expiration of a predetermined period of time. Any and all such variations, and any combination thereof, are contemplated to be within the scope of embodiments of the present invention. Once play of the video file is completed, the optimized frame of the video file is presented as the background of the search engine homepage, as indicated at block 518.

As can be understood, embodiments of the present invention provide systems and methods for exposing video user interface elements associated with search engine homepages. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3, 400 of FIG. 4 and 500 of FIG. 5 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more hardware computer-readable storage media storing computer-useable instructions that, when used by one or more computing devices, cause the one or more computing devices to perform a method for exposing video user interface elements associated with search engine homepages, the method comprising:
   receiving a request for presentation of a search engine homepage;
   transmitting a video file for presentation as the background for the search engine homepage, the video file having a plurality of sequentially-arranged frames, wherein a first portion of the plurality of sequentially-arranged frames contains the same content and a second portion of the plurality of sequentially-arranged frames contains content which differs;
   when a first user action with respect to the search engine homepage is detected, initiating play of the at least one video element upon detection of the first user action; and
   when no user action with respect to the search engine homepage is detected within a predetermined amount of time, automatically initiating play of the video file presented as the background for the search engine homepage without user action.

2. The one or more hardware computer-readable storage media of claim 1,
   wherein receiving the request for presentation of the search engine homepage comprises receiving the request from a client device,
   and wherein the method further comprises, prior to transmitting the video file, determining that the requesting client device is capable of presenting video content as the background for the search engine homepage.

3. The one or more hardware computer-readable storage media of claim 1,
   wherein one of the plurality of sequentially-arranged frames is an optimized frame of the video file, wherein the optimized frame comprises a frame that is optimized utilizing at least one of a compression technique or a resolution-altering technique,
   and wherein when the video file is not playing, the optimized frame is presented as the background for the search engine homepage.

4. The one or more hardware computer-readable storage media of claim 1, wherein the method further comprises:
   when a first user action with respect to the search engine homepage is detected within the predetermined amount of time, initiating play of the video file upon detection of the first user action.

5. The one or more hardware computer-readable storage media of claim 4, wherein detecting the first user action comprises detecting one of a movement of a mouse or cursor, a click, or a tap.

6. The one or more hardware computer-readable storage media of claim 1, wherein the second portion of the plurality of sequentially-arranged frames comprises one or more user interface elements, each user interface element being associated with an additional information segment that is associated with the background of the search engine homepage.

7. The one or more hardware computer-readable storage media of claim 6, wherein the method further comprises:
   detecting a first user action with respect to a particular one of the one or more user interface elements; and
   upon detecting the first user action, causing the additional information segment associated with the particular one of the one or more user interface elements to be presented.

8. The one or more hardware computer-readable storage media of claim 7, wherein detecting the first user action comprises detecting a hover action, a click, and/or a tap, over a region of the background of the search engine homepage that is within a defined proximity to the particular one of the one or more user interface elements.

9. The one or more hardware computer-readable storage media of claim 6, wherein each of the one or more user interface elements includes a boundary that is visible when the video file is not playing.

10. A system for exposing video user interface elements associated with search engine homepages, the system comprising:
    a computing device having one or more processors and one or more computer-readable storage media;
    a search server; and
    a data store coupled with the search server,
    wherein the search server:
    A) receives a request for presentation of a search engine homepage;
    B) transmits an image for presentation as the background for the search engine homepage, the image having at least one video element embedded therein;
    C) when a first user action with respect to the search engine homepage is detected, initiates play of the at least one video element upon detection of the first user action; and
    D) when no user action with respect to the search engine homepage is detected within a predetermined amount of time, automatically initiates play of the at least one video element presented as the background for the search engine homepage upon expiration of the predetermined amount of time.

11. The system of claim 10,
    wherein the search server receives the request for the search engine homepage from a client device,
    and wherein, prior to transmitting the image for presentation, the search server determines that the requesting client device is capable of presenting video content as at least a portion of the background for the search engine homepage.

12. The system of claim 10, wherein the first user action is one of a movement of a mouse or cursor, a click, or a tap.

13. The system of claim 10, wherein each of the at least one video elements comprises a user interface element, each user interface element being associated with an additional information segment associated with the background of the search engine homepage.

14. The system of claim 13, wherein the search server further:
    detects a first user action with respect to a particular one of the user interface elements; and
    upon detecting the first user action, causes the additional information segment associated with the particular one of the user interface elements to be presented.

15. The system of claim 14, wherein the second user action comprises a hover action, a click, and/or a tap, over a region of the image that is within a defined proximity to the particular one of the user interface elements.

16. The system of claim 13, wherein each of the user interface elements includes a boundary that is visible when the associated video element is not playing.

17. A method being performed by one or more computing devices including at least one processor, for exposing video user interface elements associated with search engine homepages, the method comprising:
- receiving a request for presentation of a search engine homepage from a client device;
- determining that the requesting client device is capable of presenting video content as the background of the search engine homepage;
- transmitting a video file for presentation as the background for the search engine homepage, the video file having a plurality of sequentially-arranged frames, wherein a first portion of the plurality of sequentially-arranged frames contains the same content and a second portion of the plurality of sequentially-arranged frames contains content which differs, and wherein one of the sequentially-arranged frames is an optimized frame of the video file, wherein the optimized frame comprises a frame that is optimized utilizing at least one of a compression technique or a resolution-altering technique; and
- when no user action with respect to the search engine homepage is detected within a predetermined amount of time, automatically initiating play of the video file presented as the background for the search engine homepage upon expiration of the predetermined amount of time, wherein once play of the video file is completed, the optimized frame of the video file is presented as the background of the search engine homepage.

18. The method of claim 17, further comprising:
- when a first user action with respect to the search engine homepage is detected within the predetermined amount of time,
- initiating play of the video file upon detection of the first user action.

19. The method of claim 17, wherein the second portion of the plurality of sequentially-arranged frames comprise one or more user interface elements, each user interface element being associated with an additional information segment that is associated with the background of the search engine homepage.

* * * * *